United States Patent [19]

Hübner et al.

[11] 4,367,297

[45] Jan. 4, 1983

[54] WATER-SOLUBLE POLY(METH)ACRYLIC ACID DERIVATIVES GELS AND THEIR MANUFACTURE

[75] Inventors: Wolfgang Hübner, Kempen; Werner Fischer, Krefeld, both of Fed. Rep. of Germany

[73] Assignee: Chemische Fabrik Stockhausen GmbH, Krefeld, Fed. Rep. of Germany

[21] Appl. No.: 234,150

[22] Filed: Feb. 13, 1981

[30] Foreign Application Priority Data

Feb. 13, 1981 [DE] Fed. Rep. of Germany ....... 3005446

[51] Int. Cl.$^3$ .............................................. C08L 33/02
[52] U.S. Cl. ..................................... 523/130; 524/407
[58] Field of Search .................... 260/29.6 M, 29.6 T, 260/29.6 WQ; 523/130

[56] References Cited

U.S. PATENT DOCUMENTS 3,502,149  3/1970  Pence ........................... 260/29.6 M

*Primary Examiner*—Joseph L. Schofer
*Assistant Examiner*—N. Sarofin
*Attorney, Agent, or Firm*—Jones, Tullar & Cooper

[57] ABSTRACT

This invention relates to gels consisting of the reaction product of water-soluble polymers of poly(meth)acrylic acid derivatives and multivalent metal salts, in which connection such gels are characterized by the fact that they consist either of the reaction product of a W/O dispersion of the water-soluble polymers with water-soluble solutions of the metal salts, or of the reaction product of aqueous polymer solutions with W/O emulsions of the metal salts. Further, the invention relates to a process for the production of the gels, as well as their use to seal or consolidate permeable soluble materials and to form mortar type combining masses.

28 Claims, No Drawings

WATER-SOLUBLE POLY(METH)ACRYLIC ACID DERIVATIVES GELS AND THEIR MANUFACTURE

This invention relates to a stable, rigid, hydrated gel, and a process of preparing same, such gel being useful for sealing or consolidating permeable solid materials.

Water-soluble polymer-based gels are used to stabilize or seal earth formations against the ingress or egress of liquids and gases. The earth formations may be formed with fissures that contain cavities of various sizes or may be strata of dense, fine-grain materials having very small pores and very few faults. During construction of reservoirs, for example, the material frequently has to be treated with gels whilst, for general construction purposes, it is often necessary to seal and/or consolidate fine-sand strata.

The processes used for this purpose comprise, amongst other things, the use of water-soluble polymers in the form of aqueous solutions of polyvalent metal salts.

It is well known that gels of water-soluble poly(meth)acrylic acid derivatives and co-polymers may be produced alone or in combination with semi-synthetic carboxyalkyl cellulose (see, for example, U.S. Pat. Nos. 3,971,440; 4,081,286; and 4,043,921). Formation of the gels is achieved by reaction of the aqueous solutions of the polymers with polyvalent metallic ions (a preferred method being the reduction of $CrO_4^{2-}$ to $Cr^{3+}$), whereby the water-soluble polymers are converted into almost insoluble gels in the nascent state. The formation of the gels proceeds according to the choice of suitable reduction agents and depending on the pH value of the reaction medium may occur immediately or after some delay.

In order to be effective, the components that are to be gelled—i.e., the aqueous polymer solutions and the metal salts for the gels that are formed—must penetrate into the formation being treated. It is a well-known property of flow mechanics that when a viscous liquid is allowed to penetrate through a material, there is a sharp increase in flow resistance and the use of high-molecular polymers, e.g., polyacrylamide, not only increase the energy losses of the liquid flow but also reduce the penetration speed of the liquid (see E. Naudascher, *Wasserwirtschaft*, No. 62, (1962): "Beeinflussung stroemungstechnischer Vorgäuage durch Additive").

For this reason, it is difficult to use highly viscous solutions of water-soluble polymers, wherein the solution viscosity increases sharply with increasing concentration.

According to U.S. Pat. No. 4,018,286, for example, a maximum of 1% polymer solutions is used (which is also in accordance with previous practice) in order to permit the use of pumpable liquids, the solution viscosity of such high molecular polymers at 1% concentration in water being typically 1,000–16,000 mPa.sec. On the other hand, these markedly hydrated gels frequently do not display the desired rigidity and strength, so that, for example, they may be expressed from formations that are under pressure as a result of insufficient mechanical strength.

The production of these gels is effected by the addition of polyvalent amphoteric metallic ions (such as, for example, $Al^{3+}$) and is reversibly affected by regulation of the pH value in the medium. The gels produced according to U.S. Pat. No. 4,018,286 with $Al^{3+}$ ions have proved to be too unstable, however, In addition, the treatment of these gels with additional chemicals in such a manner is too costly and time-consuming.

Hydrated gels having good strength are obtained from low-molecular polymers; however, here too, the solutions have high viscosity values when they have high polymer contents.

In addition, from the biological point of view, the use of Cr salts is doubtful in many areas of application. It is frequently impossible to obtain compact homogenous gels from aqueous polymer solutions with Fe salts, since when the solutions of anionically active polyacrylamides are mixed, reaction takes place at the phase limits of the solution droplets with the formation of insoluble compounds, and these interrupt the further reaction to a homogenous mechanically stable gel.

Another process for producing gels based on water-soluble polymers uses solutions of suitable water-soluble monomers, e.g., acrylamide. The 5–10% monomer solutions are polymerized after the addition of inhibitors and catalysts, whereupon simultaneous gel formation is achieved by a small concentration of cross-linking agent (for example, methylene bis-acrylamide) in the solution.

In principle, this process is very simple and has been used effectively in many areas. In particular, it offers advantages for injection into dense earth formations because of the low viscosity of the solutions, but, at the same time, it entails several clear disadvantages, as set forth below.

1. Firstly, it is well-known that the polymerization reaction conditions employed in formation of the gels are extremely critical—e.g., with respect to monomer concentration and temperature—and are particularly sensitive to impurities in the reaction medium, and the polymerization is therefore easily inhibited or interrupted. Thus, for example, it is known that $Fe^{3+}$ ions or $NaNO_2$ act as inhibitors of the gel formation process. Furthermore, a change in the catalyst concentration, involving either excess or insufficient concentration of a component of the catalyst system—e.g., ammonium persulfate—can hinder formation of the gel. This results in difficulties in those applications where formation of the gel cannot be directly monitored, e.g., where such formation takes place in the ground. For this reason, when the system is used to seal off water ingress or for consolidation in areas of ground that contain water, it must be assessed critically from the ecological and economical points of view because of the residual quantities of the monomer. It is known that in such areas of application, a loss of stabilizing liquid can rarely be totally prevented, whereas when the monomer solution is heavily diluted and conditions are unfavorable, stabilization is at best only partially complete—i.e., part of the monomer stabilizing liquid dissolved in the water remains free—and in addition, weak gels are formed, the characteristics of which are not amenable to improvement.

2. Secondly, handling dry acrylamide monomers which can involve inhalation of toxic dust as well as other components of the system (dimethylaminopropionitrile is an irritant and persulfates are powerful oxidants) necessitates extensive safety precautions.

Thus, it is an object of the invention to provide a gel which is simple to produce, penetrates cavities in ground formations or construction components rapidly and thoroughly and seals these cavities against liquids and gases and at the same time is sufficiently stable to withstand the effects of chemical action (e.g., by salt water) and large mechanical loads.

According to this invention, this object is realised by the use of novel polymer gels that consist of the reaction products of one or more water-soluble polymers of poly(meth)acrylic acid derivatives and polyvalent metal salts, these being either reaction products of a W/O dispersion of the water-soluble polymer or polymers with an aqueous solution of the metal or the reaction product of an aqueous polymer solution with a W/O emulsion of the metallic salt.

More particularly, the gel consists of the reaction product of one or more water-soluble polymers of poly(meth)acrylic acid and its derivatives and one or more polyvalent metal salts, characterized in that said reaction product is that of either said water-soluble polymer or polymers with aqueous solutions of said metal salt or salts present as a W/O dispersion or aqueous solutions of polymer or polymers with W/O emulsions of said metal salt or salts.

If the gel according to the invention consists of the reaction product of a W/O dispersion of the water-soluble polymer and an aqueous metal salt solution, it is preferred that the W/O dispersion be formed directly, rather than from a polymer which requires to be subsequently dissolved and/or dispersed.

The W/O polymer dispersions that are useful in this invention are known and a process for the production of these polymers is described, for example, in German Pat. No. 1,089,173.

Aqueous solutions of ethylenic unsaturated monomers are dispersed in an external oil phase to form a W/O emulsion and then subjected to radical polymerisation. Examples of suitable water-soluble monomers are acrylic acid, methacrylic acid (or itaconic acid) as well as derivatives of these carboxylic acids—for example, acrylamide and methacrylamide—or the salts and water-soluble esters of carboxylic acids, (e.g., dimethylaminoethylmethacrylate) as well as the derivatives of these acids with quaternary nitrogen, in which connection these monomers can be co-polymerised either alone or in admixture. In addition, the polymers in low concentrations (approximately 0.1 to 10% by weight based upon the sum of all the monomer components) can also be built up from ethylenic compounds that are only water-soluble to a limited extent, as hydrophobic monomer units such as water-soluble acrylic acids or methacrylic acid esters, vinyl acetate, vinyl pyrrolidone or acrylonitrile, as well as small percentages of doubly ethylenically unsaturated compounds such as, for example, methylene bisacrylamide.

By the addition of monomers that cause cross-linking, the water solubility of the polymer is restricted, and this can be advantageous in certain applications.

The percentage of polymer in the gel preferably lies in the range of 1–40% (more preferably between 5 and 15%) by weight. The percentage of polymer in the gel influences its mechanical characteristics in that more solid gels are obtained at high percentages.

In the event that the gel according to the invention consists of the reaction product of an aqueous polymer solution with a W/O emulsion, then the polymer solutions are based on the same water-soluble polymers as the W/O polymer dispersions. In this case, the percentage of polymer in the gel is preferably in the range of 0.1 to 4%, but especially from 1–30% by weight.

The gels according to the invention contain polyvalent metal salts based upon the folowing: $Al^{3+}$, $Cr^{3+}$, $Fe^{2+}$, $Fe^{3+}$, $Ni^{2+}$, $Cu^{2+}$, $Ag^{+}$, $Sn^{2+}$, $La^{3+}$, $Ce^{4+}$, $Pb^{2+}$, $Hg^{2+}$, and/or $UO_2^{2+}$, preferably $Al^{3+}$, $Ti^{3+}$, $Cr^{3+}$, $Fe^{2+}$. and/or $Fe^{3+}$. Whereas, during the prior art polymerisation process described above, $Fe^{3+}$ ions have an inhibiting effect to the extent that only weak, markedly inhomogenous gels can be obtained, in the process of the present ivention, $Fe^{3+}$ ions are preferred as polyvalent metal salts. In addition to the polyvalent metals, other salts of alkali or alkali earth metals ions can be present. The content of polyvalent metal salts in the gel preferably lies in the range from 0.1–10-%—more preferably from 0.1 to 5% by weight.

The gels according to the invention can also contain additional activators for phase inversion of the W/O polymer dispersion in the salt solution or the W/O emulsion of the metal salts respectively. Linking agents with a high HLB number of preferably greater than 10 (according to the Atlas-HLB-system 'Atlas-Chemie GmbH') are used as such activators. A large number of such suitable linking agents are known and described, for example, in German Pat. No. 2,154,081. Examples of such linking agents are anionic linking agents (for example, alkali metal soaps and alkali metal salts of alkyl-aryl sulfonic acid), cationic linking agents (for example, salts of long chain amines and non-ionogenic linking agents, e.g., the condensation products of alkylphenol or higher fatty alcohols with ethylene oxide).

The percentage of the gel in the activator depends on its composition and on the required gel—formation time and preferably lies in the range of 0.5 to 10%—more preferably from 0.5 to 5% by weight.

A further aspect of the invention is a process for production of gels of water-soluble polymers of poly(meth)acrylic acid derivatives and multivalent metal salts, wherein:

(a) said water-soluble polymers in the form of W/O dispersions are converted with aqueous solutions of the multivalent metal salts; or (b) the aqueous solutions of the polymers are converted with W/O emulsions of the metal salts.

It is preferred that the conversion be performed in the presence of activators for the phase conversion of the W/O polymer dispersions or W/O emulsions of the metal salts, respectively. It is further preferred that the reaction elements be mixed prior to the conversion, if necessary with mechanical assistance. It is yet further preferred that the activator be added to one of the two reaction components before they are mixed; however, it can also be added to the mixture of the reaction components after mixing, which is preferred in the case of the conversion of an aqueous polymer solution with a W/O emulsion of the polyvalent metal salts. Surprisingly, it has been found that the phase conversion of the polymer dispersion or W/O emulsion, respectively, during reaction of the polymer to a gel can be delayed initially by the polyvalent metal salt, so that the liquid mixture in the first phase displays no significant increase in viscosity but remains fluid. In a second phase, gel-formation and phase conversion, occurs spontaneously in the absence of auxiliary agents but may be delayed to some degree, the inhibition of the gel formation being controllable either:

(a) by using different concentrations of polyvalent metal salts in the solution and/or (b) by selection of the type and concentration of the conversion activator.

The mixture can be made to gel immediately by the addition of a base to the mixture the reaction components and several bases are suitable for this purpose. The quantity of base required for formation of the gel is dependent on the basicity or acidity, respectively, of the reaction components used.

The W/O dispersions or W/O emulsions of the metal salts, respectively, that are used for production of the gels according to the invention have an oil phase as well as an emulsifier as additional components. The oil phase is formed of hydrophobic hydrocarbons, such as certain liquid hydrocarbon fractions and like synthetic products or by chlorinated hydrocarbons. The emulsifiers or emulsifier mixtures can be those with a low HLB number (less than 8), such as, for example, glycerine-$C_{14}$–$C_{20}$ ester, sorbitan monoleate, or sorbitan monostearate and those with HLB values greater than ten, e.g., ethoxylated nonylphenol (degree of ethoxylation 6–20) ethoxylated fatty alcohols or fatty acids with 10–22 hydrocarbon atoms. These additional components of the W/O dispersion or W/O emulsion of the aqueous metal salt solution, respectively, in a hydrophobic phase are also well-known. Typical dispersions or emulsions respectively contain approximately 30–70% by weight of the hydrophobic phase and from 0.1 to 15% by weight of emulsifier or emulsifier mixture, respectively.

Thus, the selection of hydrocarbon/emulsifier combination makes it possible to influence the characteristics of the gels, e.g., brittle gels are obtained using isoparaffinic hydrocarbons whereas aliphatic-naphthenic hydrocarbons result in an elastic rubber-like gels. The radical polymerization proceeds with the help of the usual polymerization initiators, such as peroxides, azo compounds and/or redox systems or by photochemical means, e.g., by ultra-violet irradiation and is then conducted at a temperature in the range from 5°–120° C., as a rule under normal pressure, whereupon the monomers are converted completely to W/O polymer dispersions. The conditions of polymerisation are generally selected such that high molecular weight polymers (500,000–8 million) are formed—these determining the viscosity of the aqueous polymer solutions.

In addition, low molecular weight polymers can be used, since the high polymer concentrations possible in the W/O polymer dispersion and the cross-linking reaction of the W/O polymer dispersions with multivalent metal ions, form stable gels.

The polymer dispersions described can be used "as is" or in mixtures with other W/O polymer dispersions based on water-soluble polymers. Thus, for example, it is also possible to use a mixture of different ionogenic or ionogenic and non-ionogenic W/O polymer dispersions.

W/O polymer dispersions having a polymer content from 10 to 70, especially 10 to 50% by weight, are preferred for the production of the gels according to the invention.

The aqueous metal salt solutions that are used have concentrations of 0.01 to 20% preferably 0.2 to 10% and, particularly 0.5 to 5% by weight. The gel-formation time is dependent on the concentration of the salts. Dilution of the salt solution accelerates the formation of the metal ion-containing insoluble gels.

Unlike the prior-art gel production process described above, in which the addition of water inhibits the formation of the gel, in the process according to the invention dilution of the system leads to premature formation of the gel, which is highly desirable in many cases.

The reaction components may be brought together in any suitable manner; for example, the W/O polymer dispersion can be mechanically mixed into the salt solution. However, the mechanical mixing process affects the gel formation conditions for any given composition of the liquid mixture and this should be taken into account in selecting the appropriate procedures and conditions for performing the process on a production scale. If a W/O emulsion of the metal salt is converted with an aqueous polymer solution, it is initially preferred that the solution of the metal salt is emulsified to a suitable W/O emulsion by means of a suitable W/O emulsifier, and this can be mixed in with the aqueous phase, if necessary with agitation.

Thus, the "open-time" for handling the liquid mixture is reduced by heavy mechanical treatment. In the same manner, the gelling process is somewhat temperature-dependent, such gelling being slower at lower temperatures.

The conversion of an aqueous mixture of W/O polymer dispersion and, for example, $FeCl_3.6H_2O$ to a gel is not gradual and occurs in such a manner that the viscosity does not increase uniformly with respect to time after the admixture of the components but, dependent upon the salt concentration used, takes place immediately or after a certain period of time during which the mixture remains quite liquid and then gels rapidly with a rapid increase in viscosity together with gradual increase in the strength of the gel. Phase conversion and gelling take place without any noticeable thermal effect, with the advantageous result that the condition of the gel remains unchanged. Dyes or solids of various kinds, e.g., sand, cement, bentonite, wood dust, polyurethane dust and metal filings can be added to the mixture prior to gelling.

The gels according to the invention are hydrated, cloudy, non-inflammable substances of various strengths, which may be colorless or coloured as a result of the metallic ions. Good, homogenous, compact gels having various characteristics can be obtained by varying the percentage of polymers and the remaining components of the aqueous and oily phases in the mixture with the polyvalent metal salts. Thus, for example, gels of various strengths and colours, that are only slightly soluble or insoluble in water and which are either brittle or rubbery, can be obtained.

The use of isoparaffinic hydrocarbons as the oily phase results in gels that are frequently strong (particularly in W/O polymer dispersions) but which are, however, unstable under mechanical load. The use of aliphatic naphthenic hydrocarbons as the oily phase, particularly with W/O polymer dispersions that are predominantly anionic and/or non-ionic in aqueous solution, results on the other hand in reasonably solid but mechanically stable elastic gels.

The gels described above display evident adhesive properties either in themselves or when the liquid base mixture is sprayed or poured on a solid surface of concrete, glass, metal, wood, etc. Accordingly, these gels can be used in widely varied fields of application. Because of the ease with which they can be shaped (either before the gel state is reached or by cutting the gels) they can be used for covering cavities or in general as insulating materials. They are well suited as sealants used to seal off water ingress or drainage in cavities. In this connection, the use of the gels in ground that contains water entails the following advantage vis a vis known gel production processes:

(1) Solid, elastic, sealing gel masses can be produced, which remain stable against mechanical action in damp areas.

(2) Production of the gel is not as vulnerable to impurity and dilution of the liquid W/O polymer dispersion and metal salt mixture with water, which facilitates handling, promotes the formation of the gel condition.

(3) The W/O polymer components are more ecologically acceptable.

In a similar manner, the gels which have been described can be used to consolidate loose, fine or coarse grade materials—for example, sand and gravel. The gels adhere to the materials and bind them into a solid mass in the same manner as mortar and consolidate them in the required form.

In addition, the gel-like substances formed from the mobile homogenous mixture possess characteristics which are more advantageous from the application point of view because of the high polymer content and the type of conversion, such characteristics including greater elastic strength as well as improved chemical resistance.

In order to compare the gel characteristics of the new substances, with the prior art and to clearly demonstrate the important differences and advantages of the novel substance, the comparison will be made on the basis of gels containing $Fe^{3+}$ ions:

1. On combining a high molecular anionic copolymer in a 1% aqueous solution—the polymer being formed from 30 mol-percent, sodium acrylate and acrylamide (viscosimetric molecular weight approximately 5 million)—with a 1% solution of $FeCl_3.6H_2O$, a (non-homogenous) precipitate is immediately formed.

2. In order to retard the reaction and the formation of the gel, U.S. Pat. No. 4,018,286 describes the additional use of retarding ions (in the form of citrate, nitrilotriacetate, tartrate, tripolyphosphate, methaphosphate, gluconate, and orthophosphate) which facilitate the combination and mixing of the polymer and salt solution. Homogenous aqueous polymer-$Fe^{3+}$ gels are, of course, obtained with the copolymer described in (1) with increased retarding agent concentration—e.g., 100,000 ppm citronic acid, $(C_6H_8)_7.H_2O$—and increased $Fe^{3+}$ concentrations (20,000 ppm). The Brookfield viscosity of the copolymer solution is 5500 mPa.sec., after the addition of citronic acid is 320 mPa.sec.; and after the addition of $Fe^{3+}$ is 920 mPa.sec. The markedly hydrated gel that is obtained in this manner is not stable with regard to shape but melts more than $Cr^{3+}$ gels that are formed in a similar manner. In contrast to the $Cr^{3+}$ gels, it absorbs water and is more liquid. Characteristic of these gels is their behavior in a filter press. Because of their deficient strength they can be passed through a sieve (with a mesh size of 0.315 mm) at 7 bar. In addition, the polymer $Fe^{3+}$ gel described above is dissolved in 0.1 n HCl(pH1) with formation of a slimy white precipitate, as described in U.S. Pat. No. 4,018,286.

3. In the production of a gel according to the invention, which consists of a W/O polymer dispersion and polyvalent metal salts, there is no requirement for hydrated polymer solutions at specific concentrations and in specific quantities and no specific retarding agents of the type described in U.S. Pat. No. 4,018,286, are used. The working time can be controlled by the concentration of metal salt (for example, $FeCl_3.6H_2O$) since the open time surprisingly increases as the salt concentration is increased. Dilution with water causes the conversion into a gel to be accelerated. The result is a homogenous, abrasion-resistant, stable gel which is insoluble in water but which swells only a little. Furthermore, the swelling can be controlled and reduced by means of salts dissolved in the water.

The gels possess sufficient strength to seal off porous permeable media, the impermeability and consolidation being such that the gels can also withstand considerable pressure loading (e.g. 7 bar). As far as mechanical characteristics such as strength, elasticity, and tensile strength are concerned, the dispersion gels clearly differ from the formerly applied strongly hydrated gels. The $Fe^{3+}$ gel according to the invention, was not dissolved in 0.1 n HCl but the sample nevertheless retained its shape. When stored at 80° C. in water for a period in excess of 8 days, the gel is stable. The data cited in U.S. Pat. No. 4,018,286, which refers to the dispersion of polymers, relates to a dispersion of the polymer in a specific quantity of water and the subsequent addition of the desired amount of crosslinking agent, resulting in a solution of complexing, retarding ions and a polyvalent metal ion.

A dispersion of a conventional, water-soluble polymer in powder form cannot be used effectively because of the swelling and gradual dissolution of the particles and premature reaction of the components. According to the description cited above, the mixture should therefore be injected as an aqueous solution, with or without delay.

According to the prior art, although a W/O polymer dispersion can be dispersed in water, the finely dispersed polymer will be immediately dissolved, however, during phase inversion, obviously with a marked increase in viscosity, and the ensuing procedure corresponds with the disadvantageous characteristics revealed by work with polymer solutions described above.

The process according to the invention works with W/O polymer dispersions that are, in turn, dispersed in polyvalent metal salt solutions, the mixtures remaining mobile, and the time period until phase inversion with simultaneous gelling occurs can be adjusted, there being no noticeable occurrence of the water-soluble, high viscosity polymer solution stage.

The gels according to the invention are advantageously produced immediately prior to their use by mixing or reaction of the components. Thus, the components can be delivered separately to the work place.

The following examples illustrate the production of the polymers (A-F) according to the invention which are used, as well as the gels according to the invention, and their characteristics.

EXAMPLE A

The following components were mixed together in a reaction vessel having an agitator, a thermometer, and inlet and outlet valves for nitrogen: 724 parts of a mixture consisting of 82% saturated aliphatic hydrocarbon and 18% naphthenic hydrocarbon (boiling range of the mixture, 243°–329° C.), 97 parts sorbitan monostearate and 33 parts of an ethoxylated fatty alcohol ($C_{12}$-$C_{18}$, degree of ethoxylation 3-7). Then a solution of 861 parts water, 394 parts acrylamide 275 parts of acrylic acid and 265 parts NaOH, (45%) of which the pH value had been adjusted to 8.0, was added and a W/O-polymer dispersion was formed with agitation. Nitrogen was then passed through the emulsion for 20 minutes and a solution of 0.6 parts 2,2-azobisisobutyronitrile in a little acetone was added. The mixture was heated to 60° C., and a homogenous W/O-polymer dispersion that was stable against sedimentation was formed during polymerisation.

The W/O-polymer dispersion was mixed with 78 parts of an ethoxylated nonylphenol (degree of ethoxylation 7–11). The viscosimetrically determined molecular weight of the polymer was approximately $6.7 \times 10^6$; and the resultant aqueous solution containing 0.5% polymer had a viscosity of 9100 mPa.sec.

EXAMPLE B

The procedure described above was followed and initially the oil phase was formed from 39.5 parts of a mixture consisting of 82% saturated aliphatic hydrocarbon and 18% naphthenic hydrocarbon (boiling range, 243°–329° C.), 5 parts of sorbitan monooleate and 2 parts of an ethoxylated nonylphenol (degree of ethoxylation 4–8). Then a solution of 47 parts of water, 29 parts of acrylamide and 3 parts of acrylic acid as well as 36 parts of caustic soda solution, (45%) of which the pH value had been adjusted to 8.0, was added and mixed with the hydrophobic phase of the W/O-dispersion.

Nitrogen was passed through the emulsion for 20 minutes and a solution of 0.9 g 2,2'-azobisisobutyronitrile in a little acetone was added. The mixture was heated to 60° C., and a W/O-polymer dispersion was formed during polymerization.

The resulting W/O-polymer dispersion was mixed with 14 parts of the polymer from Example A and 5 parts of an ethoxylated, propoxylated nonylphenol (degree of ethoxylation 12–16, degree of propoxylation 3–17). The aqueous solution containing 0.5% polymer had a viscosity of 1700 mPa.sec.

EXAMPLE C

The procedure described above was followed and an oily phase was formed from 262 parts of a mixture consisting of 82% saturated aliphatic hydrocarbon and 18% naphthenic hydrocarbon (boiling range, 243°–329° C.), 33 parts of sorbitan monostearate and 20 parts of an ethoxylated fatty alcohol ($C_{-12}$–$C_{-18}$, degree of ethoxylation 3–7).

An aqueous solution of 344 parts water and 147 parts acrylamide, of which the pH value was adjusted to 8.0, was added and a W/O dispersion formed during agitation. Nitrogen was passed through the emulsion and polymerized as above with 0.5 parts 2,2'-azobisisobutyronitrile, dissolved in a little acetone to form a homogenous W/O-polymer dispersion.

The aqueous solution containing 1% of the polymer had a viscosity of 3100 mPa.sec.

EXAMPLE D

The process used for the production of polymer A was followed; however, an additional 0.2 parts methylene bis-acrylamide was added to the aqueous solution of 861 parts water, 394 parts acrylamide and 215 parts acrylic acid.

The polymerisation carried out in the manner described above resulted in a water-insoluble polymer in a W/O dispersion that at a concentration of 0.5% increased the viscosity of the aqueous solution to 920 mPa.sec.

EXAMPLE E

The process described above was followed and initially an oily phase was formed from 254 parts of a mixture consisting of 82% saturated aliphatic hydrocarbon and 18% naphthenic hydrocarbon (boiling range, 243°–329° C.), and 30 parts sorbitan monostearate. Then the W/O dispersion was formed by the addition of a solution consisting of 286 parts water, 170 parts acrylamide and 70 parts trimethylammonium chloride ethylmethacrylate that had been adjusted to a pH value of 3, with agitation. Once again nitrogen was passed through the emulsion for 20 minutes, and a solution of 0.5 parts of 2,2'-azobisisobutyronitrile in a little acetone was added and the mixture heated to 60° C.

The resulting homogeneous W/O-polymer dispersion was mixed with 7 parts of an ethoxylated fatty alcohol ($C_{12-18}$, degree of ethoxylation 8–12), and 1% concentration of polymer increased the viscosity of the aqueous solution to 10400 mPa.sec.

EXAMPLE F

Using the apparatus described above for the production of the polymer A, an analogous procedure was followed. Thus, the oily phase was formed from 254 parts of a mixture consisting of 82% saturated aliphatic hydrocarbon and 18% naphthenic hydrocarbon (boiling range, 243°–329° C.), 30 parts sorbitan monostearate and 7 parts of a fatty alcohol ($C_{12-18}$, degree of ethoxylation 3–7). Then a solution prepared from 288 parts water, 158 parts acrylamide, 70 parts trimethylammonium chloride ethylmethacrylate, 12 parts acrylic acid, 0.65 parts NaOH and 2.3 parts butylmethacrylate was prepared and added to the oily phase during agitation, whereby the W/O dispersion was formed. Nitrogen was then passed through the emulsion for 20 minutes and a solution of 0.6 parts 2,2'-azobisisobutyronitrile in a little acetone was added and the mixture heated to 60° C. The homogeneous polymer dispersion was formed by polymerization. 29 parts of an ethoxylated nonylphenol was added as an activator, (degree of ethoxylation 7–12). The concentration of polymer increased the viscosity of the aqueous solution to 8600 mPa.sec.

EXAMPLE 1

Under defined conditions, mixtures consisting of 2 parts $FeCl_3.6H_2O$ solution of various concentrations and 1 part of the W/O-polymer dispersion from Example A were produced in each case with an agitator rotating at 300 rpm for a period of 10 minutes. The viscosity of the mobile mixture was measured with a Haake Vt 01 viscosimeter (measuring body 1) and the time from the initiation of the mixing process until gel formation was determined. The time for thickening and gel formation to occur was dependent on the concentration of the salt solution.

| Concentration of $FeCl_3.6H_2O$ | Viscosity of the Mixture | Time to Completion of Gelling |
| --- | --- | --- |
| 2 | 23 (mPa.sec) | 4.5 (Min.) |
| 2,25 | | 9 |
| 2,5 | 20 | 14 |
| 2,75 | | 22 |
| 3,0 | | 28,5 |
| 3,5 | | 34 |

-continued

| Concentration of $FeCl_3 \cdot 6H_2O$ | Viscosity of the Mixture | Time to Completion of Gelling |
|---|---|---|
| 4,0 | | 68,5 |

It will be appreciated from the foregoing that the gelling of a mixture consisting of a salt solution and W/O-polymer dispersion can be delayed by the addition of extra salt. The gelling times are also dependent on the particular mixture process selected.

EXAMPLE 2

150 ml of an aqueous 5% solution of $Fe_2(SO_4)_3$ and 60 grams of the W/O-polymer dispersion from Example A were mixed to form a stable liquid polymer dispersion by mixing the components. After the addition during agitation of a solution of 2.0 grams NaOH and 50 ml water, a gel formed immediately.

EXAMPLE 3

70 g of the W/O-polymer dispersion from Example A was mixed with 150 grams of a 4% aqueous $FeCl_3 \cdot 6H_2O$ solution. A brown-colored elastic gel, insoluble in water, was formed.

EXAMPLE 4

60 g of the W/O-polymer dispersion from Example A were mixed with 150 g of an 0.5% aqueous Titan III chlorid solution. A water-insoluble, elastic gel, initially grey-green but which changed on the outside to white when exposed to air and gave up relatively little water by evaporation, was formed.

EXAMPLE 5

150 g of a 0.3% aqueous solution of potassium dichromate ($K_2Cr_2O_7$) was mixed with 0.36 g sodium pyrosulphite. 60 g of the W/O-polymer dispersion from Example A was added and gelling took place immediately to form a solid, water-insoluble green gel.

EXAMPLE 6

150 g of a 3% aqueous $AlCl_3 \cdot 6H_2O$ solution was mixed with 60 g of the W/O-polymer dispersion for Example A. Gelling began after 10 minutes, whereupon the gel became increasingly solid.

EXAMPLE 7

In each case, 150 g of an aqueous 4% $FeCl_3 \cdot 6H_2O$ solution were prepared and 60 g of the W/O-polymer dispersion from Example C added. Depending on the quantity of ethoxylated propoxylated nonylphenol (degree of ethoxylation 12-16, degree of propoxylation 3-7) added as emulsion inverter to the salt solution, the gelling time of the mixture to a colorless very elastic gel was observed to be variable.

| Quantity of Emulsion Inverter added (% related to the W/O-polymer dispersion) | Commencement of Gelling (Min.) | Completion of Gelling after minutes |
|---|---|---|
| 5% | Immediate | 5 |
| 4% | 5 | 16 |
| 3% | 11 | 35 |

EXAMPLE 8

60 g of the W/O-polymer dispersion of Example B containing two different strongly anionically active polymers were in each case mixed with 120 g of $FeCl_3 \cdot 6H_2O$ solution of various concentrations.

The mixtures obtained are of higher viscosity than those of Example 1, because of the different ionogenic polymer components. The gel-formation times were dependent on the salt concentrations:

| Concentration $FeCl_3 \cdot 6H_2O$ | Viscosity of the Mixture (mPa.sec) | Gel-formation Times (Min.) |
|---|---|---|
| 1.0 | 23 | 1.5 |
| 1.5 | 20 | 6 |
| 2.0 | 29 | 20 |

EXAMPLE 9

60 g of the W/O-polymer dispersion of Example D, containing partially cross-linked polymer was added to 120 g of 2% aqueous $FeCl_3 \cdot 6H_2O$ solution. After approximately 8 min. a green tinted gel was formed, that, however, was almost non-deformable elastically and displayed only a slight degree of solubility so that it disintegrated under mechanical load. Similarly mechanically unstable substances were obtained from the gelation of mixtures of cationically and anionically active W/O-polymer dispersions.

EXAMPLE 10

A liquid polymer mixture of 600 g of the W/O-polymer dispersion of Example A and 1200 g of an aqueous 3% $FeCl_3 \cdot 6H_2O$ solution was prepared.

The mixture was diluted with various quantities of water and the gelling observed as follows:
(a) The liquid was mixed with water in the ratio 2:1. The gel formed after 3 minutes.
(b) The liquid mixture was mixed with water in the proportion 1:1. Gelling commenced after 1 min.
(c) 200 g of the mixture were added to 1,000 ml water. Immediately, finely divided unstable gel flakes formed and the viscosity of the liquid increased after a brief period of agitation to 1720 mPa.sec. and after two hours was measured at 4680 mPa.sec. After two days the mixture containing 1.4% polymer was homogenously gelled and the viscosity measured with a Brookfield viscometer was approximately 127000 mPa.sec. These experiments show that gel-formation is accelerated by dilution of the polymer mixture.

EXAMPLES 11 to 16

120 g of a 2.5% $FeCl_3 \cdot 6H_2O$ solution were added to 60 g of the W/O-polymer dispersion during agitation and in each case, a quantity of 10% (based upon the total mixture) of the following substances was added to the mixture: Example 11—cement; Example 12—Bentonite; Example 13—wood and dust; Example 14—hard polyurethane foam dust; Example 15—sand; Example 16—iron filings.

After a short time a gel was formed in which case, such gel containing the finely divided solids.

EXAMPLE 17

A concrete wall having three vertical bores (diameter approximately 1.5 cm) arranged one upon the other are provided with a vessel on one side, such being filled with sand and water and so located that the water flowed from the vessel through the holes.

A liquid mixture of 1000 ml aqueous 2% $FeCl_3.6H_2O$ solution, and 500 ml W/O-polymer dispersion from Example A was forced under pressure into the lower hole through a pipe that simultaneously plugged the bore. The gel formed approximately 8 min. after the introduction of the mixture. (This was monitored by comparison with the help of a glass probe). Since during its introduction, the mixture flowed both horizontally depending on the density of the sand packing and upwards into the water/sand mixture, all three holes were closed and sealed by the gel that formed.

By removing the sand filling and the water the sand-containing gel could be observed as an elongated plug in front of the holes.

The mixture of W/O-polymer dispersion and the multivalent salt was effective as a sealing agent.

EXAMPLE 18

One part of the W/O-polymer dispersion from Example A was mixed with two parts of a 2% aqueous $CuSO_4.5H_2O$ solution. A solid, elastic, light blue opaque gel was formed.

EXAMPLE 19

One part of the W/O-polymer dispersion from Example A and two parts of an aqueous 2% $FeCl_3.6H_2O$ solution were mixed together and poured into a mold specially produced for this experiment. The initially unstable gel which formed was checked in a tensile-test machine for rubber (load range 0–250 kg, maximum stretch 300%) after 48 hours storage under normal conditions in a closed vessel. The sample withstood a 100% stretch at a load in excess of 950 g.

EXAMPLE 20

A mixture of one part of the W/O-polymer dispersion of Example A and two parts of a 2.5% aqueous $FeCl_3.6H_2O$ solution was in each case poured into a pipe filled with:
(a) fine filter sand
(b) coarse sand so that the sand was saturated with the liquid.

The gel formed after approximately 20 minutes and adhered to the bed and solidified the sand like a mortar (as a binding mass) so that to a certain extent it was stabilized against mechanical action in its free-standing condition without a protective tube.

EXAMPLE 21

In order to check the durability of the gel produced in Experiment 17 with respect to several chemicals, pieces of the gel were stored in various aqueous solutions.

Previous observations indicated that the gel was to a great extent resistant to 10% NaCl solution, saturated $MgSO_4$ solution, saturated $CaCl_2$ solution, and to synthetic mineral water (165 g/L NaCl; 33 g/L $CaCl_2.2H_2O$; 12.8 g/L $MgCl_2.6H_2O$).

EXAMPLE 22

After approximately 15 minutes, an almost colorless solid gel was formed from a mixture of an aqueous 2% $FeCl_3.6H_2O$ solution and the W/O-polymer dispersion of Example E in the proportion of 2:1. Initially, this gel was unstable under mechanical load (i.e., easily disintegrated) but, however, became increasingly solid and displayed a certain elasticity. The gel was insoluble in water and swelled somewhat.

EXAMPLE 23

The W/O-polymer dispersion of Examples A and E were mixed in equal parts. An aqueous 2% $FeCl_3.6H_2O$ solution and the W/O-polymer dispersion mixture were added together in the ratio 2:1 during agitation. After approximately two minutes, the mixture began to gel. A water-insoluble, brownish, very elastic gel was formed.

EXAMPLE 24

The W/O-polymer dispersion of Example F was mixed with an aqueous 2% $FeCl_3.6H_2O$ solution in the proportion 1:2. The mixture gelled to form after 15 minutes, a solid, slightly elastic gel.

EXAMPLE 25

50 g of the W/O-polymer dispersion of Example A were mixed with 100 g of a 2% metal salt solution of respectively $NiCl_2.6H_2O$; $CuCl_2.2H_2O$; $AgNO_3$; $SnCl_2.2H_2O$; $La(NO_3)_3.6H_2O$; $Ce(SO_4)_2.4H_2O$; $Pb(NO_3)_2$; $Hg(NO_3)_2$; and $UO_2(CH_3COO)_2.2H_2O$ with agitation. In each case the mixture resulted in a solid gel.

EXAMPLE 26

97 g of a 2% aqueous $FeCl_3.6H_2O$ solution were added to 10 g of inversion emulsifier (as in Example 7). The solution was added with agitation to 53 g of a 56.5% polymer containing the W/O dispersion of Example B. This resulted in a brown gel having a high degree of strength.

EXAMPLE 27

28.5 g of a 2% aqueous solution of $AlCl_3.6H_2O$ were mixed with 21.5 g of a solution of the aliphatic, naphthenic hydrocarbon mixture according to example A and 1.5 g sorbitan oleate, which acts as a W/O emulsifier.

Equal parts by weight of the W/O emulsion so formed and a 20% aqueous solution of a polymer of acrylamide and ammonium acrylate were mixed during agitation and added to an ethoxylated nonylphenyl (degree of ethoxylation 7–11) the latter in the amount of 10% by weight of the total mixture. A white gel was formed upon phase change of the W/O emulsion with an increase in viscosity in the mixture.

EXAMPLE 28

28.5 g of a 2% aqueous solution of titan III chloride were produced as described in Example 27 with the addition of 21.5 g of the aliphatic naphthenic hydrocarbon mixture containing 1.5 g sorbitan oleate by mixing the components.

In each case the emulsion was mixed with agitation with equal parts by weight of the 20% polymer solution of acrylamide and ammonium acrylate and mixed with 10% by weight of the total mixture of a wetting agent, on the basis of a propoxylated, ethoxylated nonylphenol. A green gel was formed.

EXAMPLE 29

40 g of a 3% aqueous solution of $FeCl_3.6H_2O$ was mixed with 30 g of the liquid aliphatic naphthenic hydrocarbon according to Example A, containing 2.1 g glycerine monooleate as a W/O emulsifier. During agitation, the mixture formed a W/O emulsion. The emulsion was mixed during agitation with equal parts of a 10% aqueous polymer solution of acrylamide and ammonium acrylate and mixed with 10% by weight of the total mixture of a wetting agent based on an ethoxylated nonylphenol (degree of ethoxylation 7-11). A brown gel was formed.

The embodiments of the invention in which an exclusive property or privilege is claimed are defined as follows:

1. A gel consisting of the reaction product of (A) one or more water-soluble polymers of (i) one or more of acrylic acid, acrylamide and methacrylamide, salts and water soluble esters of acrylic acid and methacrylamide, salts and water soluble esters of acrylic acid and methacrylic acid; (ii) copolymers of the above containing about 0.1 to about 10% by weight of other hydrophobic monomer units; and (iii) said polymers of (i) and (ii) further containing small water solubility restricting amounts of diethylenically unsaturated monomers and (B) one or more polyvalent metal salts characterized in that said reaction product is that of either said water-soluble polymer or polymers with aqueous solutions of said metal salt or salts present as a W/O dispersion, or aqueous solutions of said polymer or polymers with W/O emulsions of said metal salt or salts.

2. A gel according to claim 1, wherein said reaction product is that of one or more W/O dispersion polymers or copolymers with said metal salt or salts in solution.

3. A gel according to claim 1 or 2, wherein said reaction product is that of a polymer of one or more water-soluble monomers of the group consisting of acrylic acid, methacrylic acid and salts, esters or quaternization products thereof with said metal salt or salts.

4. A gel according to claim 3, wherein said monomers are water-soluble esters or quaternization products of acrylic or methacrylic acid.

5. A gel according to claim 3, wherein said polymers are present in small amounts, from 0.1 to 10% by weight, relative to the sum of all the monomer components and are built up from one or several monomers which are only partially soluble in water, such monomers being those of acrylic acid or methacrylic acid esters, vinyl acetate, vinyl pyrrolidone or acrylonitrile.

6. A gel according to claim 3 wherein said metal salt or salts contain one or more of the group consisting of: $Al^{3+}$, $Ti^{3+}$, $Cr^{3+}$, $Fe^{2+}$, $Ni^{2+}$, $Cu^{2+}$, $Ag^+$, $Sn^{2+}$, $La^{3+}$, $Ce^{4+}$, $Pb^{2+}$, $Hg^{2+}$, and/or $UO_2^{2+}$, preferably $Al^{3+}$, $Ti^{3+}$, $Cr^{3+}$, $Fe^{2+}$, and/or $Fe^{3+}$.

7. A gel according to claim 3, wherein the amount of polymer in the reaction product of W/O polymer dispersion and aqueous metal salt solution is from 4 to 15%, by weight.

8. A gel according to claim 3, wherein the amount of polymer in the reaction product of aqueous solution of the polymer Q/O emulsion of the metal salt is from 1 to 30%, by weight.

9. A gel according to claim 3, wherein the metal salt-content amounts to 0.1 to 10%, by weight.

10. A gel according to claim 3, containing an activator for the phase inversion of the W/O polymer dispersion or the W/O metal salt emulsion, respectively.

11. A gel according to claim 10, wherein said activator consists of an emulsifier or an emulsifier mixture with an HLB number greater than 10.

12. A gel according to claim 10, having an activator content of 0.5 to 10%, by weight.

13. A process for the production of gels of (A) water-soluble polymers of (i) one or more of acrylic acid, acrylamide and metacrylamide, salts and water soluble esters of acrylic acid and methacrylic acid; (ii) copolymers of the above containing about 0.1 to about 10% by weight of other hydrophobic monomer units; and (iii) said polymers of (i) and (ii) further containing small water solubility restricting amounts of diethylenically unsaturated monomers and (B) multivalent metal salts, wherein:
 (a) said water-soluble polymers in the form of W/O dispersions are converted with aqueous solutions of the multivalent metal salts; or
 (b) the aqueous solutions of the polymers are converted with W/O emulsions of the metals salts to form a gel.

14. A process according to claim 13, wherein the conversion is performed in the presence of an activator for the phase inversion of the W/O polymer dispersion or the W/O emulsion of the metal salts, respectively.

15. A process according to claims 13 or 14, characterized in that the reaction components are mixed prior to the conversion step.

16. A process according to claim 15, characterized in that the activator is added to the two reaction components prior to mixing.

17. A process according to claim 15, characterized in that the activator is added to the mixture of the two reaction components.

18. A process according to claims 13 or 14, characterized in that W/O polymer dispersions with a content of 10 to 50%, by weight of water-soluble polymers, are employed.

19. A process according to claims 13 or 14, characterized in that polymers of one or several water-soluble monomers of the group consisting of acrylic acid, methacrylic acid and salts esters or quaternization products thereof are employed.

20. A process according to claim 19, characterized in that polymers of water-soluble esters of acrylic and/or methacrylic acid or its quaternisation products are employed.

21. A process according to claims 13 or 14, characterized in that polymers are employed which, in a small percentage, from 0.1 to 10% by weight in relation to the sum of all the monomer components, are built up from one or several monomers which are only partially soluble in water, said monomers being selected from the group consisting of acrylic acid or methacrylic acid esters, vinyl acetate, vinyl pyrrolidone and acrylonitrile.

22. A process according to claims 13 or 14, characterized in that the metal salts based upon one or more of the group consisting of $Al^{3+}$, $Ti^{3+}$, $Cr^{3+}$, $Fe^{2+}$, $Ni^{2+}$, $Cu^{2+}$, $Ag^{2+}$, $Sn^{2+}$, $Hg^{2+}$, and/or $UO_2^{2+}$, preferably $Al^{3+}$, $Ti^{3+}$, $Cr^{3+}$, and/or $Fe^{2+}$, are employed.

23. A process according to claims 13 or 14, characterized in that aqueous metal salt solutions having concentrations of 0.2 to 10% by weight are employed.

24. A process according to claims 13 or 14, wherein the gel formation rate is controlled by:
 (a) the concentration of the multivalent metal salts in the solution; and/or
 (b) selection and concentration of the activator.

25. A process according to claims 13 or 14, wherein a base is added in order to achieve immediate gelling.

26. A process according to claims 13 or 14, characterized in that a dye and/or solids are added to the reaction components prior to gelling.

27. A process according to claim 14, characterized in that an emulsifier or an emulsifier mixture having an HLB number greater than 10 is employed as an activator.

28. A process according to claim 27, characterized in that the activator is added in the quantity of 0.5 to 10%, preferably 0.5 to 5% by weight.

* * * * *

UNITED STATES PATENT AND TRADEMARK OFFICE
CERTIFICATE OF CORRECTION

PATENT NO. : 4,367,297
DATED : January 4, 1983
INVENTOR(S) : Wolfgang Hubner et al.

It is certified that error appears in the above—identified patent and that said Letters Patent is hereby corrected as shown below:

Claim 22, line 46, after "$Fe^{2+}$," insert --$Fe^{3+}$--.

Signed and Sealed this

Twelfth Day of April 1983

[SEAL]

Attest:

GERALD J. MOSSINGHOFF

Attesting Officer  Commissioner of Patents and Trademarks